No. 745,681. PATENTED DEC. 1, 1903.
W. H. SHELL.
DRAFT EQUALIZER.
APPLICATION FILED SEPT. 24, 1903.
NO MODEL.
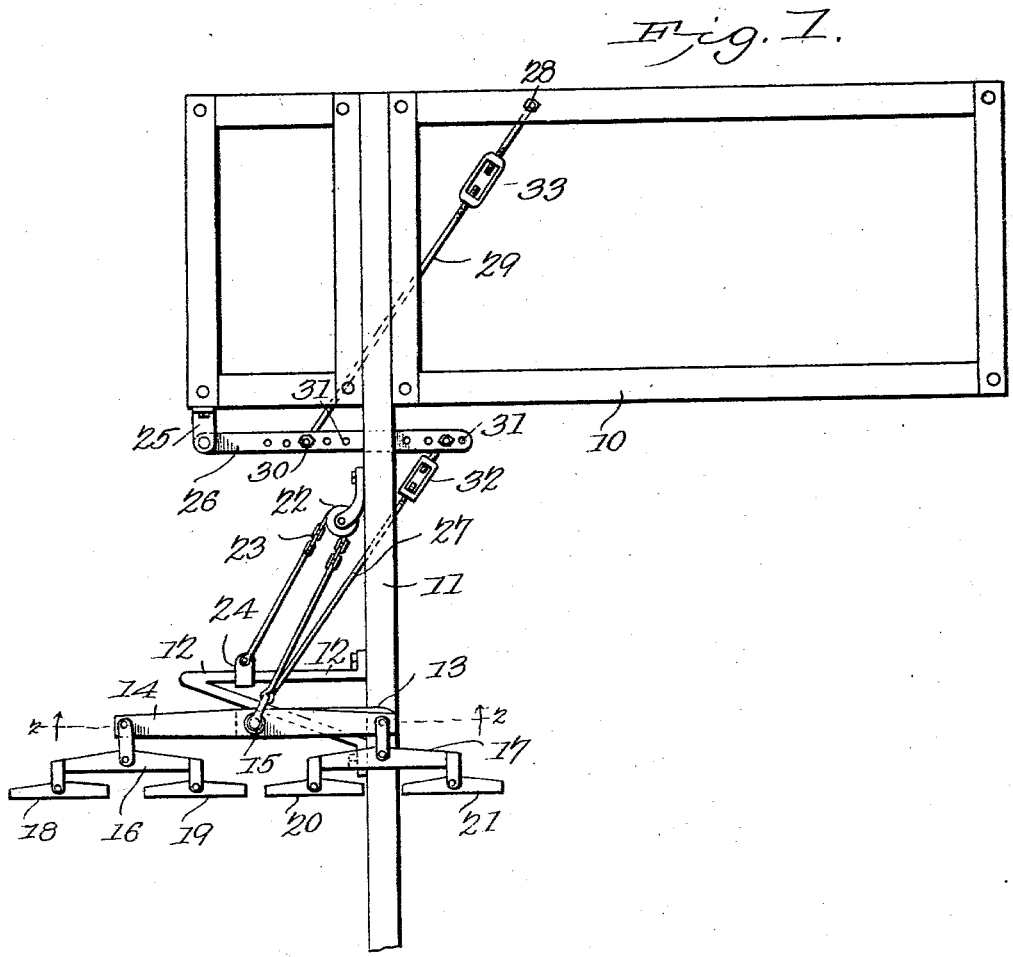
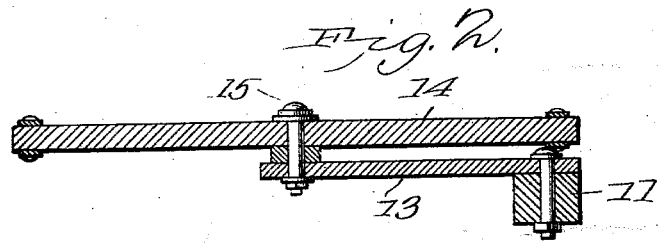
Witnesses
E. F. Stewart
C. N. Woodward
W. H. Shell, Inventor,
by C. A. Snow & Co.
Attorneys No. 745,681.

Patented December 1, 1903.

UNITED STATES PATENT OFFICE.

WILLIAM H. SHELL, OF GLENCOE, OKLAHOMA TERRITORY.

DRAFT-EQUALIZER.

SPECIFICATION forming part of Letters Patent No. 745,681, dated December 1, 1903.

Application filed September 24, 1903. Serial No. 174,505. (No model.)

*To all whom it may concern:*

Be it known that I, WILLIAM H. SHELL, a citizen of the United States, residing at Glencoe, in the county of Payne and Territory of Oklahoma, have invented a new and useful Draft-Equalizer, of which the following is a specification.

This invention relates to draft-equalizers, and has for its object to improve the construction of devices of this class and produce a device more particularly adapted to harvesters and similar machines; and the invention consists in certain novel features of construction, as hereinafter shown and described, and specified in the claims.

In the drawings illustrative of the invention, in which corresponding parts are denoted by like designating characters, Figure 1 is a plan view of the device applied to the frame of an ordinary harvester-machine. Fig. 2 is a transverse sectional elevation on the line 2 2 of Fig. 1.

The harvester-frame in represented at 10 with the draft-tongue 11 extending therefrom in the usual manner. Attached to the tongue 11 and extending over the "stubble" side is a bracket 12, and pivotally connected to the tongue, preferably opposite the bracket and extending thereover, is an arm 13, having a relatively long evener-beam 14, movably connected thereto at the free end and intermediately of the beam, as at 15. The evener-beam has doubletrees 16 17, movably connected, respectively, to the opposite ends of the evener-beam, and with swingletrees 18, 19, 20, and 21, connected to the doubletrees, as shown. The swingletrees are thus disposed with one horse adapted to travel on the grain side and three horses upon the stubble side of the tongue, as shown.

Connected to the tongue 11, between the frame 10 and bracket 12, is a guide-pulley 22, over which a chain 23 leads, and connected by one end centrally to the evener-beam 14 at its pivot 15, and by the other end to a clip 24 on the bracket 12, preferably near its outer end, as shown.

Attached by one end to the frame 10 at the stubble side, as at 25, is an equalizer-arm 26, the latter extending beyond the tongue and connected near its free end to the beam 12 at the clip 15 by a rod 27, and connected to the rear of the frame 10, intermediately of the grain side, as at 28, is a rod 29, extending diagonally of the frame and connected by its forward end to the arm 26, as at 30, intermediately thereof and opposite the stubble side of the frame 10.

The equalizer-arm 26 is provided, as shown, with a plurality of spaced apertures 31, so that the rods 27 and 29 may be adjusted longitudinally thereof to regulate the draft, and the rods may likewise be provided with means, such as turnbuckles 32 33, for adjusting them longitudinally. By this simple arrangement the draft is equalized and side draft eliminated, as the initial "pull" is on the grain or cutter-bar side at 28, and transferred thence to the equalizing-bar 26 at the stubble side and thence to the draft mechanism, thereby equalizing the strains and holding the frame uniformly in position.

The parts are simple in construction and easily applied upon and adjusted to any size or form of harvester.

Having thus described the invention, what I claim is—

1. In a draft-equalizer, the combination with the frame of a harvester having the draft-pole extending therefrom of a horizontal arm, pivoted thereto, a draft-beam pivoted to the outer end of the arm, a doubletree pivoted to the outer end of the draft-beam, a doubletree pivoted to the inner end of the draft-beam and provided with swingletrees lying one on either side of the pole, a bracket-frame attached to the stubble side of the pole, a pulley connected to the tongue in the rear of said bracket, a flexible connection carried by the pulley with one end connected to said bracket-frame near its outer end and the other end connected to said draft-beam at its pivotal point, an equalizer-beam connected to the stubble end of said harvester-frame and extending beyond the tongue, a rod connecting the free end of said equalizer-beam with said evener-beam, and a rod connecting said equalizer-beam intermediately of its length with the rear side of said harvester-frame at the grain side of said tongue, substantially as described.

2. In a draft-equalizer, the combination with the frame of a harvester having the draft-pole extending therefrom, of a horizontal arm pivoted thereto, a draft-beam pivoted to the outer end of the arm, a doubletree pivoted to the outer end of the draft-beam, a doubletree pivoted to the inner end of the draft-beam, and provided with swingletrees lying one on either side of the pole, a bracket-frame attached to the stubble side of the pole, a pulley connected to the tongue in the rear of said bracket, a flexible connection carried by the pulley with one end connected to said bracket-frame near its outer end and the other end connected to said draft-beam at its pivotal point, an equalizer-beam connected to the stubble end of said harvester-frame and extending beyond the tongue, a rod adjustably connecting the free end of said equalizer-beam with said evener-beam, and a rod adjustably connecting said equalizer-beam intermediately of its length with the rear side of said harvester-frame at the grain side of said tongue, substantially as described.

In testimony that I claim the foregoing as my own I have hereto affixed my signature in the presence of two witnesses.

WILLIAM H. SHELL.

Witnesses:
O. E. ZUCKER,
C. C. WALKER.